324-77
CROSS REFERENCE
SEARCH ROOM

Jan. 19, 1965 W. C. DERSCH 3,166,640
INTELLIGENCE CONVERSION SYSTEM
Filed Feb. 12, 1960 3 Sheets-Sheet 1

William C. Dersch,
*INVENTOR.*
*BY.*
Fraser and Bogucki
*ATTORNEYS*

William C. Dersch,
*INVENTOR.*
*BY.*
Fraser and Bogucki
*ATTORNEYS*

INTELLIGENCE CONVERSION SYSTEM

Filed Feb. 12, 1960 3 Sheets-Sheet 3

William C. Dersch,
*INVENTOR.*
*BY.*

Fraser and Bogucki

*ATTORNEYS*

United States Patent Office 3,166,640
Patented Jan. 19, 1965

3,166,640

INTELLIGENCE CONVERSION SYSTEM

William C. Dersch, Los Gatos, Calif., assignor to International Business Machines Corporation, New York, N.Y., a corporation of New York Filed Feb. 12, 1960, Ser. No. 8,368
10 Claims. (Cl. 179—1)

This invention relates to systems for converting one form of manifestation of intelligence to another form, and more particularly to a new and improved system which responds to spoken words by providing a printed or coded output manifestation.

Where electrical signals corresponding to alphabetic or numeric characters are derived from written, printed or spoken words, the problems involved in automatically identifying a particular manifestation, and converting the intelligence represented thereby to a form suitable for the control of automatic devices or processing by data processing machines, are greatly increased by what may be classified generally as noise effects. Thus, with printed or typewritten characters, for example, there are sometimes major variations between typewriter styles, and there are even variations between the characters typed by the same typewriter at different times. Whether these variations constitute changes in the blackness or density of the characters, differences in height or shape, or differences in the background against which the character is provided, they may be classified generally as noise effects. With handwritten intelligence, a great many variations are encountered which lead to even more troublesome noise effects than those encountered with printed or typewritten characters.

The problems involved in devising equipment which will satisfactorily recognize spoken words are probably even more difficult than in the case of printed, typewritten or handwritten intelligence in view of the extremely wide variation between the sounds produced when the same word is spoken by different persons or at different times by the same person. It has been shown that the sound wave produced when a word is spoken may be analyzed in terms of the amplitude and frequency modulation of its frequency components. Representations of the modulation at selected frequencies can be analyzed and a spoken word can definitely be identified.

To be of useful application, however, a system must be capable of recognizing words despite the presence of noise effects of the type which ordinarily do not affect the understanding and identification of the word by a listener. For example, the same word spoken by a woman or child has a markedly different pitch than when spoken by a man, and differences in accent and manner of speaking can appreciably alter the manner in which a specific word is expressed. Because of accent and dialect variations, and also because of personal traits, the speed of delivery of different speakers varies widely. Similarly, environmental, emotional and many other circumstances can cause marked differences in the amplitude and pitch of spoken words. Furthermore, what may be regarded as second order noise effects are introduced by the manner in which a word is used in a sentence, and differences in pronounciation caused by the immediately adjacent words in the sentence.

A number of speech recognition systems have been suggested which attempt to compensate for one of a number of the above described noise effects by particular means. Some systems attempt to recognize basic phonetic units, or phonemes, so as to provide phonetically equivalent output representations. The great number of variations in speech and the close similarity between many different ones of the phonetic units greatly complicate the operation of these systems and reduce their accuracy. In addition, an accurate and not a phonetic representation of the spoken words is needed for use in automatic data processing systems.

Other speech recognition systems are known which attempt to recognize spoken words by a comparison of electrical signal manifestations representative of the spoken word with selected standard representations. These systems have attempted to compensate for individual variations in pitch, speed and other factors, by a "normalization" of the signal, and have utilized, a "best match" between a spoken word and the standard representations to enable identification of a particular spoken word. Such systems have, however, been extremely limited in vocabulary, in that they have been able to recognize only relatively few words. Furthermore, the words have usually been monosyllabic or extremely simple in structure, such as the ten numerals from 0(oh) to nine. These systems are arranged such that the amount of circuitry necessary for recognition increases in almost direct proportion to the number of standard words utilized.

While it is extremely desirable to have a large library of reference words which can be referred to at high speed with little additional equipment, it is also essential that particular spoken words be properly distinguished irrespective of normal and natural variations in amplitude, pitch and speech rate. It is particularly desirable that, once a word is recognized, a printed or coded representation be provided rapidly and automatically. A system having these features would provide all the essential elements needed to convert spoken intelligence to a different form of intelligence directly suitable for automatic data processing machinery.

Therefore, it is an object of the present invention to provide a high speed and accurate signal conversion system which operates in response to electrical signals representing manifestations of recorded or spoken intelligence where the signals include a variety of noise effects.

It is another object of the present invention to provide a speech recognition system which is capable of operating in conjunction with a data processing system at high speed and with a minimum of equipment.

It is yet another object of the present invention to provide improved circuits and systems for identifying entire spoken words despite relatively wide variations in the delivery and the manner of origination of the words.

In accordance with one aspect of the invention, a luminous display is provided of normalized representations of certain electrical characteristics of a spoken word. These representations are compared successively with standard representations for different words, and a best match is obtained which may be used to actuate an output device which generates the successive characters of the identified word in printed or coded form.

In a particular arrangement in accordance with the invention, spoken words may be used to generate electrical signals which correspond to amplitude and frequency modulation components existing at selected different frequencies in the energy distribution of the sound wave. One or more of the electrical signals may be passed through normalizing circuitry where compensations may be made for individual amplitude, pitch and speech rate variations. The normalized electrical signal representations are converted to direct current amplitude variations with time which are then displayed on a viewing surface on a direct view storage tube as luminous traces. A reference mask adjacent the storage device is provided with a library of words in the form of a number of transpartent reference patterns against an opaque background, and the reference patterns are successively scanned across the viewing surface on the storage tube. A best match detector system positioned on the opposite side of the reference mask from the storage tube identifies that word in the library of reference words which most closely corresponds to the word represented by the waveforms on display.

In accordance with a preferred form of the invention, the reference mask may be provided with both coded and character representations, and may operate cyclically at high speed to repeatedly scan the best match relationship. In each cycle of operation, an alpha-numeric character corresponding to the identified word may be provided.

Further, in accordance with the invention, the reference mask may be so arranged as to accept normal variations in the normalized signal representations of spoken words. For this purpose, the reference patterns may consist of broadened or superimposed lines which are generated in accordance with the most probable word variations which are likely to be encountered, but which nevertheless uniquely identify a word.

The invention may be better understood by reference to the following description, taken in conjunction with the accompanying drawings, in which like reference numerals refer to like parts and in which.

Figure 1:
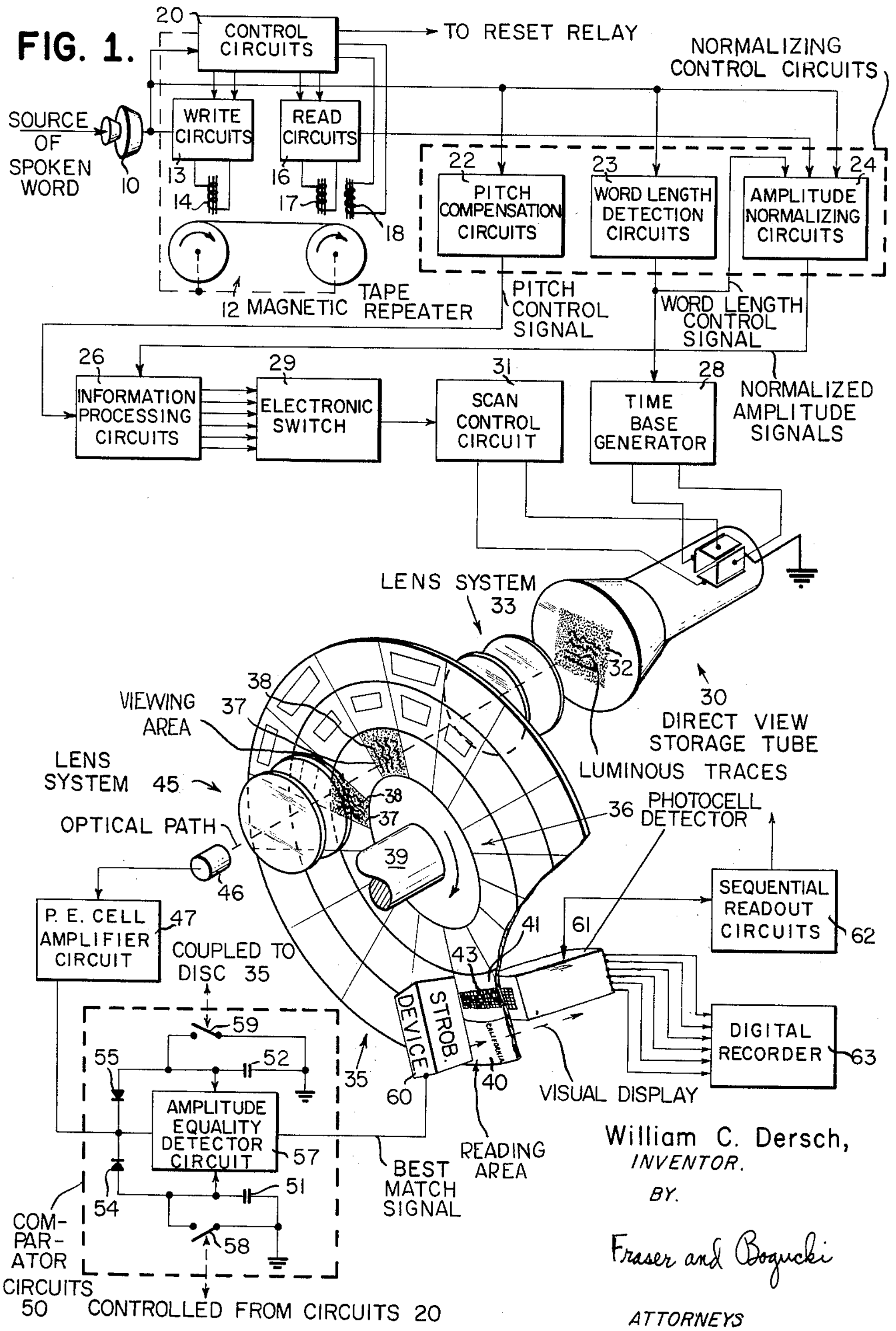
FIG. 1 is a combined block diagram and simplified perspective representation of a system including a reference mask, an information processing system, and a readout system for automatically recognizing spoken words.

A system in accordance with the present invention may recognize and identify spoken words and provide both visual and coded representations of spoken words. Sound waves comprising spoken words are received by a microphone 10 or other transducer, which generates electrical signal manifestations equivalent to the amplitude and frequency variations with time of the sound waves which are representative of the spoken word. In order to generate signals suitable for analysis, the electrical signals generated by the microphone 10 are applied to input circuits including a magnetic tape repeater 12. Associated with the tape repeater 12 are selectively activated write circuits 13 coupled to the microphone 10 and to a recording transducer 14 associated with a recording track on the recording surface of the magnetic tape repeater 12. Selectively actuable read circuits 16 associated with the recording surface derive signals from the playback transducer 17. The spacing between the recording transducer 14 and the playback transducer 17 is selected with relation to the speed of the magnetic tape so as to introduce a selected time delay. The delayed version of the signals from the microphone 10 is provided from the read circuits 16 after an interval which is at least as great as the time duration of the longest expected word.

An erase transducer 18 is also disposed along the recording track on the magnetic tape repeater 12. Control circuits 20 (indicated generally) may be coupled to the microphone 10, the write circuits 13, the read circuits 16, the erase transducer 18 and the magnetic tape repeater 12 to provide single word operation and repeated analysis if desired. No detailed description of the control circuits 20 has been provided because the associated elements may be actuated in a selected sequence by conventional switching techniques. It will also be recognized that the magnetic tape repeater 12 may be used to record an entire message in sequence and to thereafter read out one word at a time until all of the words have been identified. In the present instance, however, it may be assumed that the identification is carried out with such speed that a word can be identified in the normal delay interval between words. Thus, the electronic portion of the system to be described hereafter may be assumed to operate with sufficient rapidity so that the control circuits 20 need not maintain a recorded word on the tape repeater 12 for longer than the normal cycle of operation. The primary function of the control circuits 20 is therefore to reset various elements of the system when the operative steps have been completed, as set out in detail below.

Signals derived from the input circuits are applied to normalizing control circuits which may be arranged in accordance with the teachings of an application for patent filed by William C. Dersch, Serial No. 8,339, filing date February 12, 1960, now Patent No. 3,094,586, and entitled Signal Conversion Circuits. Reference may be made to that patent for a more complete description of the nature and the operation of the normalizing control circuits. Briefly, however, the normalizing control circuits include pitch compensation circuits 22, word length detection circuits 23 and amplitude normalizing circuits 24. The pitch compensation circuits 22 detect the variations of a spoken word from a standard pitch or frequency level and provide a pitch control signal to associated information processing circuits 26. Where the pitch of spoken words is higher than a selected center pitch, the control signal from the pitch compensation circuits is used to adjust variable band pass filters within the information processing circuits 26 so as to provide pitch normalized information therefrom.

The amplitude normalizing circuits 24 receive the undelayed signal representations of spoken words directly from the microphone 10, and the delayed version thereof from the read circuits 16. The directly received signals are used to derive a signal representing an average for a selected time interval (that of the longest expected word). Concurrently, the word length detection circuits 23 provide a word length control signal proportional to the actual length in time of the spoken word. The delayed version of the spoken word is then passed through two variable gain devices in series, one of which adjusts amplitude according to the average obtained, and the other of which adjusts amplitude according to actual word length. The normalized amplitude signals are applied to the information processing circuits 26 along with the pitch control signals. In consequence, output signals from the information processing circuits 26 are both pitch and amplitude normalized, but of the same length (in time) as the original spoken word.

Further details as to information processing circuits 26 which may be employed are set out in conjunction with FIG. 5 below. It may be assumed, however, that an accurate and unique characterization of each spoken word may be provided by three time varying signals which represent frequency modulation components of three different frequencies, and three other time varying signals which represent amplitude modulation components at three different frequencies. Such frequency and amplitude signals are derived in six parallel lines or channels which simultaneously carry the signals which vary in amplitude with time over the duration within which the spoken word is provided. Word length (or speech rate) normalization is accomplished by means of a time base generator 28 which is energized by the word length control signals.

The six separate channels from the information processing circuits 26 are switched to a common output in sequence by an electronic switch 29 so that the characteristic waveforms or curves represented by the time varying signals in the separate channels are successively utilized. With a sufficiently high switching rate no intelligence is lost. Thus, by the use of time sharing all of the waveforms are made available at the same time for display on a direct view storage tube 30 which is operated under control of the time base generator 28 and the signals provided by the electronic switch 29. The time base generator 28 controls the horizontal deflection circuits, so as to change the sweep rate to provide a selected normalized length along the horizontal direction no matter what the duration of the spoken word. The signals from the electronic switch 29 control the vertical deflection circuits of the storage tube 30. In order that the signals provided from the electronic switch 29 may be displayed with respect to separate base lines, on the viewing surface 32 of the tube 30, a scan control circuit 31 is coupled in the vertical deflection circuitry. The signal storage properties of the direct view storage tube 30 consequently are used to provide parallel displays of the three different frequency signals and three different amplitude signals which fully characterize a spoken word.

It will be understood trat the terms "horizontal" and "vertical" are used merely for reference and to exemplify the attitudes shown in the drawings. The patterns on the viewing surface 32 may actually occur in any attitude desired.

The standard length and selectively positioned waveforms representative of normalized signals which are presented as luminous traces on the viewing surface 32 are focused by a lens system 33, indicated only generally, on reference patterns provided circumferentially on a rotatable reference mask 36. The reference mask 36 is principally an opaque inner circumferential region on a rotating disc 35, and is divided into circumferential segments 37, each of which has a number of reference patterns disposed thereon which identify spoken words. The reference mask 36 may be of Lucite, and the reference patterns 38 in the form of transparent lines thereon, with each of the lines corresponding in length and amplitude variations to a different standard frequency curve or amplitude curve for the selected word. Only a few of the circumferential segments 37 have been shown by way of illustration but it will be understood that the number to be employed may be greatly increased so as to increase the library of reference patterns and words. In addition, it will be recognized that other techniques may be employed for scanning reference patterns past a viewing surface. A sprocketed film formed in a continuous loop and driven at extremely high speed might be employed to provide high library capacity, for example. At a number of points in the drawings it will be observed that the luminous traces and transparent lines have been shown by dark lines for clarity.

The disc 35 on which the reference mask 36 is mounted rotates about a central shaft 39, and may be driven by a motor (not shown). Circumferential zones bearing other indicia are included in the outer portion of the disc 35. As shown in the detailed fragmentary view of FIG. 3, in the outer circumferential zone of the disc 35, separate segments 40 may include printed words defined by contrasting transparent and opaque areas which may be illuminated stroboscopically to provide a visual display of a word which has been identified.

Circumferential segments 41 occupy an intermediate circumferential zone about the disc 35 with transparent indicia 43 on these segments 41 containing binary coded representations of each of the characters contained in the word associated with that segment. By displacing the segments 40 and 41 about the disc with respect to the corresponding reference patterns representing the same word, the reading area may be located in any angular desired position relative to the optical path starting with storage tube 30. Thus, as shown in FIG. 1, the segments 40 and 41 may be displaced by an angle less than 180° with respect to the reference pattern for the same word (California) which is then at the reading area. The viewing area of the reference patterns is confined to the one segment 37 which is optically aligned with the viewing surface 32, the other segments 37 being shielded.

Referring again to FIG. 1 above, the optical path which is defined by the presentation area on the viewing surface 32, the lens system 35 and the viewing area of the reference patterns 38 is completed by another lens system 45 which causes light passing through the reference patterns 38 to be focused on a photoelectric cell 46. Amplitude variations in the signals provided from the photoelectric cell 46 are applied to an amplifier circuit 47 and then to a comparator circuit 50 which determines which of the reference patterns has the best match to the patterns being displayed on the viewing surface 32.

The comparator circuit 50 includes a pair of storage capacitors 51, 52, a first of which capacitors 51 provides storage of word amplitudes during the entire interval utilized in the analysis of a spoken word, and a second of which capacitors 52 stores the maximum amplitude derived during each different scan of reference patterns 38 across the display on the viewing surface 32. Thus, the signal on the second storage capacitor 52 may be indicated as a transient amplitude representative of variations occurring within a single revolution which is to be compared to the temporary reference maintained on the first storage capacitor 51. Signals from the amplifier 47 are coupled through like poled diodes 54, 55 to the capacitors 51 and 52 respectively, which are also coupled to an amplitude equality detector circuit 57. A word reset relay 58 coupled in shunt with the first storage capacitor 51 is controlled by reset signals from the control circuits 20, the reset signals being provided on completion of readout. A pattern reset relay 59 is coupled to shunt the second storage capacitor 52. The pattern reset relay 59 is normally closed, but is periodically opened in synchronism with the rotation of the disc 35 by a mechanical coupling to a cam surface (not shown in FIG. 1) on the disc 35. The second capacitor 52 therefore is charged by the signals derived as the reference pattern 38 passes across the display on the viewing surface 32. When the disc 35 has passed through a full revolution, however, the reset relay 59 is closed, to discharge the capacitor 52.

A mechanical coupling is shown diagrammatically by means of a dashed line between the disc and the pattern reset relay 59, but electrical couplings and sampling techniques of other kinds may be used as well. The operation which is provided is that of sampling the output from the photoelectric cell 46 during a full cycle of rotation of the disc 35.

The equality detector circuit 57 provides, after the first revolution of the disc 35, a pulse for each best match of the reference patterns 38 on a circumferential segment 37 to the displayed waveform representations of the spoken word. This best match signal is used as a pulse to actuate a stroboscopic device 60 which is positioned adjacent the region containing the word characters and transparent indicia 43 representative of the spoken word. A light passing through the regions containing the words may be viewed as a visual display. The light passing through the transparent indicia 43 may actuate one or a matrix of photocell detectors 61, which are coupled to and controlled by sequential readout circuits 62, as is described below with reference to FIG. 4. The detector 61 provide output signals which may be applied to a data processing system or other utilization apparatus such as the digital recorder 63. The sequential readout circuit 62 scans successive digital representations on the transparent indicia 43 so as to read out the successive characters of an identified word. The sequential readout circuits 62 also include a hold circuit for permitting a maximum amplitude signal to be stored in the first storage capacitor 51 during the first cycle of rotation, and a circuit for generating a signal for the control circuits 20 which indicates that all of the characters of an identified word have been read out.

In the operation of the arrangement in FIG. 1, each spoken word received at the microphone 10 is processed by the input circuits so that signals are fed both directly and after a delay into the normalizing control circuits. With a sufficiently high processing speed in the electronic circuitry to follow, identification of a word can be made in the brief interval between words, so that the operation is essentially continuous. When the speed of the system is high enough, or sufficient delay is provided between words, the spoken words may be provided directly to the system through a microphone and amplifier alone with the tape repeater 12 being omitted.

Upon generation of an electrical signal representation of a spoken word in the input circuits, the normalizing control circuits and the information processing circuits 26 act to maintain the identity of the waveform generated by the spoken word, but to normalize the word so as to eliminate the major noise effects. To this end, the directly received version is used to set pitch and average amplitude adjustments in the pitch compensation circuits 22 and amplitude normalizing circuits 24. The same signal is also measured in length in the word length detection circuits 23 and the word length control signal is generated. Then the delayed signal version of the spoken word which is applied to the amplitude normalizing circuits 24 is normalized in amplitude through the use of both the average amplitude adjustment and the word length control signal.

Within the information processing circuits 26 the pitch compensation circuits 22 act in response to the actual pitch level of the spoken word to shift the pass band of six different variable filters so that they accept significant signal components. The normalized amplitude signals applied to the six filters are divided into three amplitude demodulator channels and three frequency demodulator channels. The information processing circuits 26 output signals therefore include three direct current "amplitude" signals, representing normalized amplitude variations at three different frequencies in the audio band, and three corresponding "frequency" signals. All of the six signals carried on the output channels of the information processing circuits 26 are of the same duration as the spoken word which is to be identified.

The six time varying waveforms represented by the amplitude and frequency curves are simultaneously displayed on the direct view storage tube 30 by a high speed sampling technique. By simultaneously shifting the electron beam to different but related output channels, the scan control circuit 31 and the electronic switch 29 display all six waveforms simultaneously. Because the waveforms being displayed are representative of variations at audio frequencies, while the switching may be carried out at or near the megacycle rate, no intelligence is lost.

The patterns which are provided on the viewing surface 32 of the direct view storage tube 30 are shifted in the horizontal direction under control of the time base generator 28 so that the actual time base, represented by a selected horizontal length across the viewing surface 32, is made to be the same for each word. When the word is shorter in duration than the selected normalized duration, the time base generator 28 is caused by the word length control signal to scan more rapidly to display the normalized length on the viewing surface 32, and vice versa for words longer than the selected duration.

Figures 2, 3, 5, 6, 7, 8:
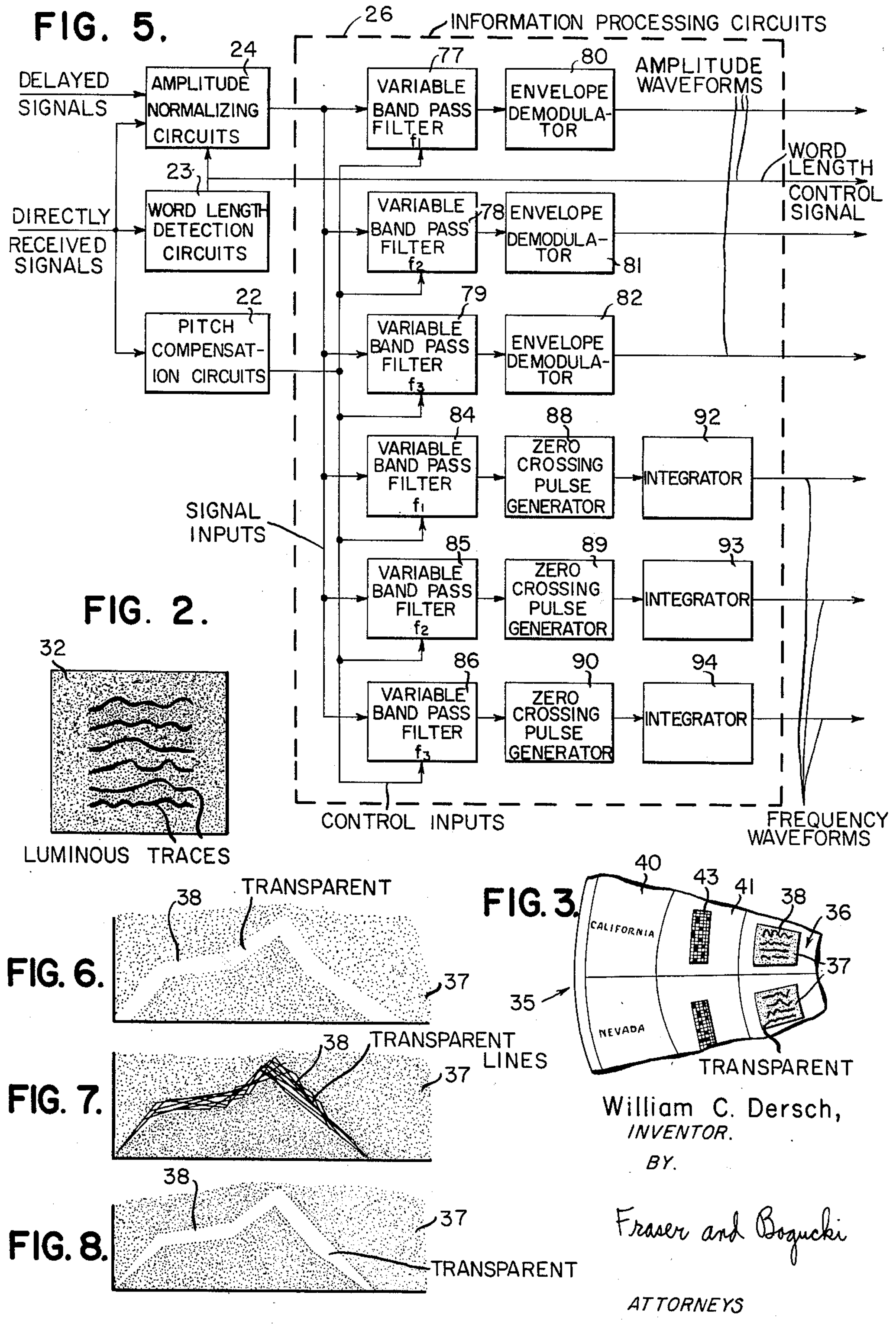
FIG. 2 is a representation of various waveforms in the system of FIG. 1 showing amplitude variations with time of the electrical signals corresponding to spoken words.
FIG. 3 is a detailed representation of a portion of a reference mask which may be employed in the arrangement of FIG. 1.
FIG. 5 is a block diagram of information processing circuits which may be employed as the like-identified unit in the system of FIG. 1.
FIGS. 6, 7 and 8 are fragmentary representations of different dispositions and configurations of reference patterns which may appear on the reference masks used in the arrangement of FIG. 1.

The signal waveforms which characterize a spoken word and which are represented as luminous traces on the viewing surface 32 are represented in more detail in FIG. 2. On completion of scanning, the normally dark viewing surface 32 includes six luminous traces representing three frequency and three amplitude waveforms. Each of the waveforms is fully normalized, so that the personal idiosyncrasies of a speaker as to pitch, amplitude and speech rate are compensated for.

Referring again to FIG. 1, the total image of the patterns thus provided is projected through the individual segments 37 of the rotating reference mask 36. The light falling on the photoelectric cell 46, and thus the output of the amplifier circuit 47, varies for each segment with the degree of registry and conformity of the reference patterns 38 with the patterns on the viewing surface 32. Repeated rotations of the disc 35 are used in the identification of a word. In a first rotation, the maximum amplitude signal provided from the cell 46 is detected and stored. In succeeding revolutions this maximum amplitude is used as a reference. The signals generated at the cell 46 for each reference pattern 38 which crosses the viewing area optically aligned with the luminous display are successively compared to the maximum amplitude. When the one pattern 38 which permits a corresponding amplitude signal to be generated crosses the display a best match is indicated.

The pattern reset relay 59 is closed momentarily once each cycle of rotation of the disc 35, then opened so that signals from the amplifier 47 charge the second storage capacitor 52. When the luminous total image on the viewing surface 32 corresponds exactly to the transparent regions of a reference pattern 38, the output of the photoelectric cell 46 and the signal level reached at the second storage capacitor 52 are a maximum. This maximum is used in identifying the unknown word. There will seldom be an exact correspondence between display and reference pattern because of the many residual noise effects which arise. Note, however, that any one of the frequency signal traces or amplitude signal traces may be considered to characterize the word which is to be identified. In most instances, this characterization may be considered to be unique. The presence of a number of different waveforms thus fully characterize the spoken word, and permits identification despite the residual noise effects.

The best match technique which is employed utilizes the first complete cycle of the reference mask 36 to establish the amplitude level representative of the best match so as to set a standard for the best match comparison. During the initial cycle, the word reset relay 58 is held open, and the varying signal from the photoelectric cell 46 and the amplifier circuit 47 is applied through the isolating diode 54 to the first storage capacitor 51. The capacitor 51 is charged to a level determined by the light falling on the cell 46 when the display is scanned by the most like reference pattern 38. The signal peaks, not average signals, are stored by charging the capacitor 51 from a low impedance source and by using a diode 54 of high back resistance. By this means the capacitor 51 is charged only by voltage levels higher in amplitude than those previously applied, so that successive peaks are picked out until a maximum peak is stored as the reference level.

The word sampling which is used, therefore, utilizes the potential level on the first storage capacitor 51 derived during the first cycle to establish a temporary reference for the word which is to be identified. During the second and each succeeding cycle of rotation of the disc 35, this temporary reference is compared to the transient levels provided as each reference pattern 38 scans the luminous display. Within the second and later cycles, the level on the second capacitor 52 is varied in response to the photocell 46 output, and the capacitor 52 is then discharged to begin a new cycle. The sampled signal will reach the same level as the temporary reference for only one reference pattern, which thus corresponds to the most likely equivalent in the library to the spoken word. When the levels on the two capacitors 51 and 52 are the same, the amplitude equality detector circuit 57 provides the best match signal. Only one best match pulse is provided for each cycle. Where desired, the second capacitor 52 could alternatively be reset for each new reference pattern instead of each new cycle. The system as thus arranged cannot, of course, identify a word which is not in the library. If desired, however, an external comparison of the temporary reference can also be made to a standard reference, to insure that the signal amplitude which is as a temporary reference exceeds some level and thus represents some degree of correspondence. It will also be appreciated that, while exact identification of a spoken word is required for use in some applications and data processing machines, in many other applications the sense of a message may readily be understood from the similarity of an incorrectly identified word to a correct word which should have been used at that point.

The best match signal which is provided from the amplitude equality detector circuit 57 and as the output signal from the comparator circuit 50 actuates the stroboscopic light source 60. After the first cycle of the reference mask 36, the light 60 flashes each time the best match is obtained, so that the recognized word is illuminated in a visual display. At the same time, the transparent binary indica 43 permit light to pass in a corresponding binary pattern through to the detector circuits 61. The detector circuits 61 may be formed in a matrix, if desired, to provide a parallel readout of the binary coded decimal equivalent of the identified word. In the present instance, however, a number of rotations are used and at each different rotation a different binary coded character is read out to the sequential readout circuits 62.

Effectively, the sequential readout circuits 62 proceed, as indicated in more detail below with reference to FIG. 4, from one binary coded character to another until a word is completely read out. The binary coded characters from the sequential readout circuits 62 actuate a digital recorder 63, such as an output printer. When the complete cycle covering all of the letters in a word corresponding to the maximum word length in the library have been completed, a reset signal is provided to the control circuits 20 and the word reset relay 58 is actuated to discharge the first storage capacitor 51. Concurrently, the reset signal activates the control circuits 20 so that a new word may be derived by suitable read circuits and the erase circuits (not shown in detail) associated with the direct view storage tube 30 are energized to prepare the viewing surface 32 for reception of a new pattern. This completes the full cycle of operation and the identification of the given spoken word.

Figure 4:
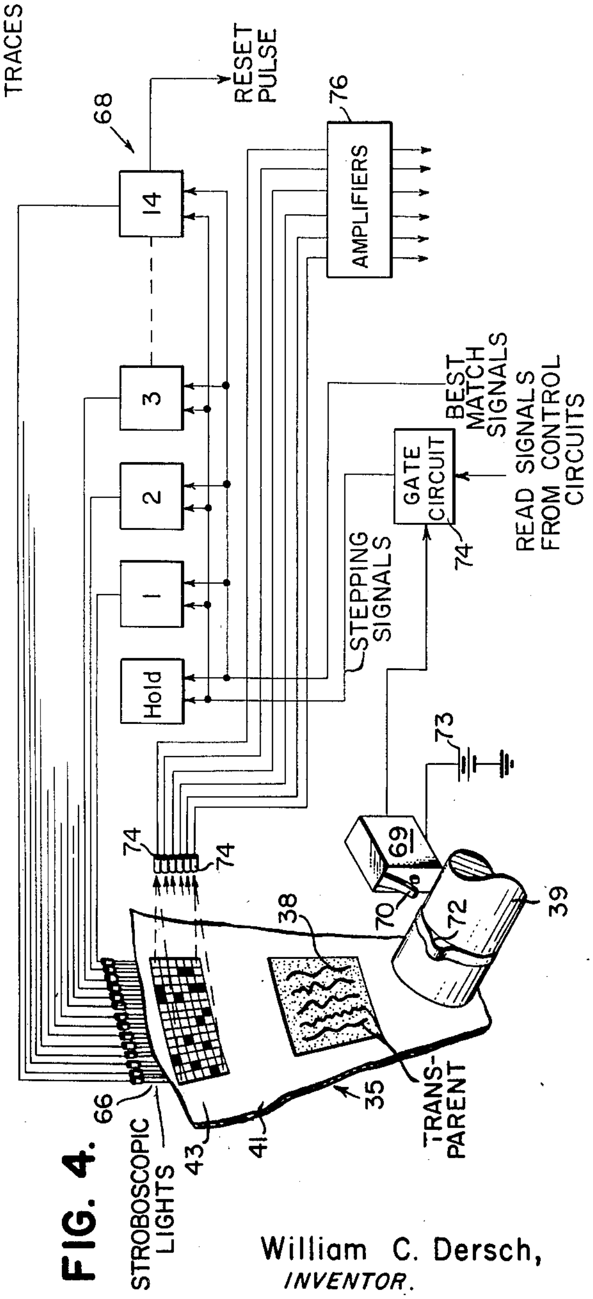
FIG. 4 is a combined block diagram and perspective representation, of a portion of the readout system of FIG. 1.

Details of a readout mechanism in accordance with the invention may be seen by reference to FIG. 4, in which is shown a fragment of the circular segments 41 at the intermediate zone of the disc 35. The transparent binary indicia 43, here arranged against an opaque background, are shown in the relative position that they occupy when a best match signal is provided. Each of the columns of binary valued transparent indicia 43 represents a different character in the word which has been recognized. When in this readout position, each of the columns of indicia 43 are aligned with a different one of a number of stroboscopic lights 66. Fourteen columns and fourteen lights 66 are shown by way of illustration, it being assumed that the longest word in the library consists of fourteen characters.

An open-ring stepping switch circuit 68 consists of fifteen stepping switch elements (not shown in detail) arranged in a series. The stepping switch elements receive the best match signal concurrently and couple the best match signal successively to the different ones of the stroboscopic lights 66. The switching elements are coupled in a stepping ring, the stepping being controlled and timed with each cycle by stepping signals provided from a switch 69 having a contact arm 70 in operative engagement with a cam surface 72 on the shaft 39 of the disc. The cam surface 72 has a single raised portion and closes the switch 69 once for each revolution to provide a momentary pulse from a D.C. source 73 to a gate circuit 74 which is kept open by read pulses from the control circuits 20 of FIG. 1 during the interval in which the signals are to be read. The stepping switch circuit 68 may be an electromechanical switch device, or comprised of electrical relay or electronic circuits, in conformity with the speed it is desired to obtain.

The first of the stepping switch elements of the circuits 68 is a hold circuit, to permit storage of the temporary reference signal during the first cycle of operation, so that the best match comparison may thereafter be made. After the first cycle, therefore, the actuation of the switch 69 by the raised portion of the cam surface 72 once each revolution causes a stepping pulse to be applied to the stepping switch circuit 68. When the next (second) best match signal is applied, after the actuation of the hold circuit, the first of the stroboscopic lights 66 is actuated to illuminate the first column of binary indicia 43 on the segment 41. The binary coded character represented by the indicia 43 is detected by a number of photocells 74, each of which is aligned with a different digital place in the column. Each of the photocells 74 is also shielded from the light passing through indicia at other digital places in the same column, as well as light from external sources. For simplicity, the shielding arrangements have not been shown.

When the first of the stroboscopic lights 66 in the sequence has been fired by the best match pulse, the first readout cycle is completed and the stepping signal is provided to switch to the next stepping switch element, so that the next best match signal fires the second of the stroboscopic lights 66, and so on for each of the succeeding best match signals.

When the fifteenth revolution of the disc has been completed and the fourteenth of the stroboscopic lights 66 has been fired, the maximum number of the digital places of the word have been tested and read out, and the best match pulse passes through the last switching element to provide a reset pulse to the control circuits 20 of FIG. 1, so that the operation may begin again with a new word. If it is desired to minimize the time by recognizing the variable length of a word which has been read out, a recognition circuit may be employed to recognize a special character following the last character of the word. The groups of parallel binary digit valued signals provided in time sequence from the photoelectric cells 74 are passed through amplifiers 76 to actuate a digital recorder 63 as indicated above with reference to FIG. 1. With the disc 36 rotating at a high rate of speed, the fourteen revolutions used to identify a complete word and to provide a corresponding digital output may be completed in appreciably less than the time in which a monosyllabic word may be spoken. Consequently, the word may be typed out in less time than is required for its verbal expression.

The manner in which three frequency signals and three amplitude signals are generated by the information processing circuits 26 of FIG. 1 under control of the normalizing control circuits is indicated in general form in FIG. 5. Amplitude signals are generated by signals passed through three different band pass filters 77, 78, 79 and associated envelope demodulators 80, 81, 82. Each of the band pass filters is selected to pass a different band of frequencies in the audio range. The amplitude normalizing circuits 24, as described in the above identified concurently filed application, derive an average signal which is representative of the average amplitude of the frequency components of the spoken word over a selected period of time. This average signal is used to control the gain of an amplifier so that the amplitude signal which is provided from the amplitude normalizing circuits 24 has a given average amplitude. The band pass filters 77, 78 and 79 which segregate the different frequency components of the normalized amplitude signal are adjusted to be responsive to different frequency bands under control of the pitch compensation circuits 22. The frequency control signal generated by the pitch compensation circuits 22 adjusts the frequency band to which the various filters 77, 78 and 79 are responsive in a sense to correspond to the sense of deviation of the spoken word from a selected normalized pitch. For example, a high pitched spoken word would cause the pass band of filters 77, 78 and 79 to be shifted upward in frequency to correspond. Thus the envelopes which are detected by the envelope demodulators 80, 81 and 82 are normalized to given standard both in pitch and in amplitude.

The frequency signals are generated in three different channels by application to parallel band pass filters 84, 85 and 86 respectively which receive the normalized amplitude signals from the amplitude normalizing circuit 24. The band pass of the frequency curve generating band pass filters 84, 85 and 86 is controlled again by the pitch compensation circuits 72. To generate the waveforms characteristic of the frequency modulation of the signals in the different bands defined by the band pass filters, there are employed zero crossing pulse generators 88, 89 and 90 which are coupled to the output terminals of the different ones of the band pass filters 84, 85 and 86 respectively. The zero crossing pulse generators 88, 89 and 90 may be single shot multivibrators which are biased to be triggered to provide a pulse of selected duration at each zero crossing in the frequency varying output signal from the associated band pass filter. An amplitude varying waveform which is normalized both in pitch and according to the amplitude of the spoken word is then generated by coupled integrator circuits 92, 93 and 94 respectively. Each of the integrator circuits 92, 93 or 94 averages the zero crossing pulses over a relatively short time constant, so as to provide an output which is characteristic of the frequency modulation in the frequency components of the different bands.

The number of amplitude signals and frequency signals which it is desired to use in a given application may be selected in accordance with the extent of the library of words which is to be used, and the accuracy with which a best match is to be determined. Accordingly both the capacity and the degree of resolution of the system may be selected within wide limits.

The individual reference patterns which are used in the reference mask may be fabricated to have the configuration and nature represented in FIGS. 6, 7 and 8. A number of factors contribute to what may be called match distortion, which represents the distortion of a displayed pattern relative to a standard pattern under influence of various noise effects. These noise effects include variations in the vertical and horizontal scales, displacement or misregistration in the horizontal and vertical scales and the nonuniformly distributed variations which are caused by differences in accent and pronounciation. It is important to note that the distortion which is present has far more than a linear effect upon the quality of match. For example, a horizontal shift in the displayed pattern of 20% does not cause a 20% degradation from a perfect match, but far more than a 20% degradation.

Accordingly, the features of the present invention include the arrangements of the masks of FIGS. 6, 7 and 8, through which match distortion effects can be minimized.

Referring specifically to FIG. 6, a mask pattern is shown which is of the type generated by photographic techniques. In such techniques, a beam or source of light, such as the light spot on the target of a cathode ray tube, may be caused to trace through the waveform which constitutes the reference waveform for a standard word. During this tracing, a photographic plate or film is exposed to the light source at a desired position, and the trace is recorded thereon. Then this reference trace may be transferred by other well known photographic techniques to the Lucite disc as a transparent pattern against an opaque background. In accordance with the arrangement of FIG. 6, the line of the reference pattern may be defocused laterally so as to produce a diminishing shading laterally with respect to the reference pattern. The defocusing may be accomplished by defocusing of the electron beam, or the optics of a projection system. Alternatively, the defocused relationship may be established by defocusing the beam of the direct view storage tube, or the lens system in the arrangement of FIG. 1. Any of these techniques may be employed to achieve the defocused relationship, and when properly used the characterization of an individual character is maintained although the tolerances thus established permit acceptance of normal variations in accent and pronounciation. It has been found that the use of the defocus technique markedly improves the recognition ability of the arrangement.

A different method of fabricating the mask is illustrated in FIG. 7, in which method a sharply focused light source is used in the photographic process. The reference pattern which is established, however, is derived by repeated exposure of the same film in the same position to the patterns represented by different voicings of the same word. By thus superimposing the patterns in equal degree along the same region of the mask, there is provided a composite pattern which has the greatest amount of variation in the region at which pronunciation and accent variations are most pronounced. The use of such a mask is more unique to a specific character than is the arrangement of FIG. 6.

A mask constructed in accordance with FIG. 8 utilizes both the successive exposures provided in accordance with the technique of FIG. 7, and also a slight defocusing as discussed above with respect to FIG. 6. With this arrangement, unlike that of FIG. 7 there is some shading laterally relative to the reference pattern, although the uniqueness characteristics are preserved within useful limits.

It will be appreciated that a number of different and alternative arrangements are possible within the scope of the invention. While the normalizing control circuits contribute appreciably to the operation of the system, it will be recognized that this function may also be provided by an operator in accordance with visual displays. Similarly, the visual display may be viewed by an operator without the use of a digital printout. Inasmuch as the mask which contains the reference patterns rotates continuously and at a fixed rate of speed, many different techniques may be employed to indicate the letter which is recognized when a best match signal is provided.

Figure 9:
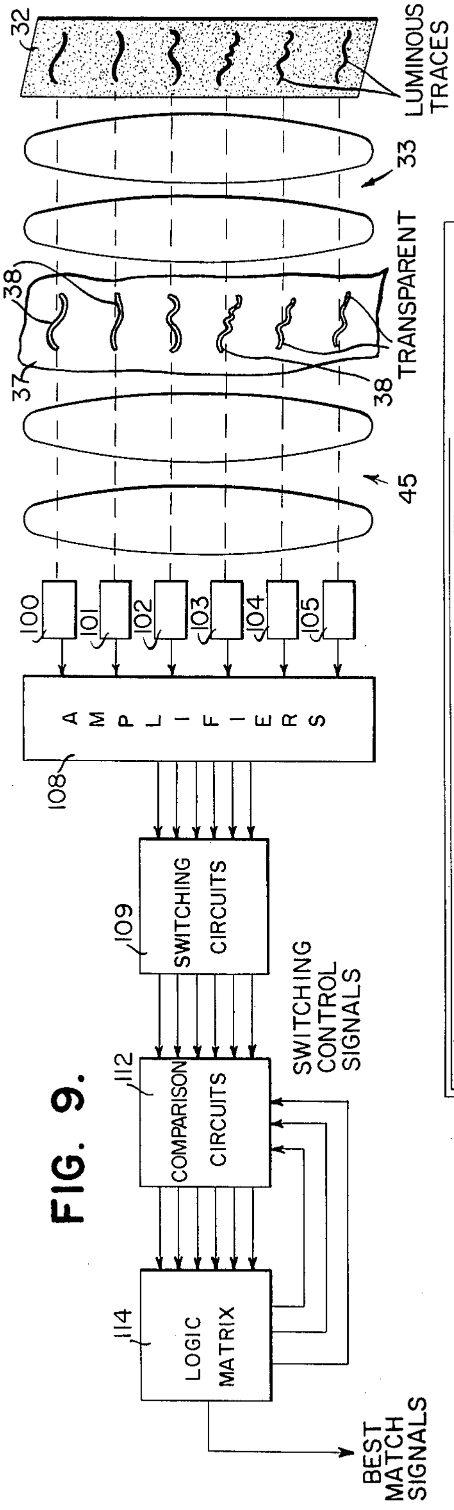
FIG. 9 is a block diagram of a different form of scanning arrangement in accordance with the invention for identifying a spoken word.

The use of different frequency bands and different frequency and amplitude curves which each characterize the spoken word may, in accordance with the invention, be utilized to provide even greater selectivity. The match between a displayed pattern and its corresponding individual reference pattern may be detected by individual photocells 100 to 105, as is indicated in FIG. 9. In FIG. 9, the displayed pattern on the viewing surface 32, the lens systems 35, 45 and the reference patterns 38 have been shown in a simplified form for clarity. The signals derived by each of the photocells 100 to 105 may be passed through separate amplifiers 108, indicated generally, and then through switching circuits 109. The switching circuits 109 are coupled to individual comparison circuits 112 each of which may correspond generally to the circuits indicated in the comparison circuits 50 of FIG. 1. Thus, during operation six different best match signals are generated from the six different characteristic signal traces which are provided (in this example) for each word. The individual comparison circuits 112 may be coupled to a logic matrix 114 which provides a single best match signal and also is coupled to control the switching circuits 109.

With this arrangement, a certain number of best match signals occurring at the same time in different ones of the channels may be accepted as indicating adequate recognition of the word, while a higher number may be accepted as indicating accurate or certain recognition of the word. With a number of channels available in this matter, more information as to the certainty of identification can also be obtained by using individual sensers in each channel to determine whether the best match signal exceeds a selected amplitude. Furthermore, the logic matrix 114 controls the switching circuits 109 so that in the comparison of signals only selected ones of the channels may be utilized. Thus, doubtful decisions may be resolved or the incapability of the machine to correctly identify a word may be ascertained.

Although there have been described above and illustrated in the drawings various exemplary arrangements in accordance with the invention for readily identifying electrical signal manifestations of intelligence such as spoken words, it will be appreciated that the invention is not limited thereto. Accordingly, the invention should be taken to include all variations, modifications and alternate arrangements falling within the scope of the appended claims.

What is claimed is:

1. Apparatus for identifying spoken words comprising means responsive to spoken words for generating a corresponding electrical signal for each word, means responsive to the electrical signals for generating normalized signals therefrom, means responsive to the normalized signals for generating a number of time varying waveforms representative of characteristic variations with time of different frequency components of the electrical signals, means responsive to the time varying waveforms for simultaneously presenting the time varying waveforms as a luminous display, a reference means movable adjacent the luminous display and including reference patterns defined by contrasting translucent and opaque areas which correspond to characteristic variations with time of different frequency components of standard words, photosensitive means positioned to receive light passing through the reference patterns from the luminous display, and means coupled to the photosensitive means and to the reference means for determining the best match between a spoken word and one of the standard words.

2. Apparatus for recognizing spoken words comprising means responsive to the words for producing electrical signals for each word which correspond to a selected average in amplitude, means responsive to the electrical signals for providing different frequency components in accordance with the pitch thereof, means responsive to the different frequency components for producing different amplitude varying waveforms which separately represent different amplitude and frequency modulation components present in the spoken word, means responsive to the time duration of the spoken words and to the different modulation components for separately and simultaneous displaying light patterns representative thereof, optical scanning means including reference means defined as light transmissive patterns against an opaque background, the reference means including patterns for a number of different known words, and the scanning means moving the patterns into successive registry with the light patterns, and means for determining the best match between the light patterns and one of the reference patterns.

3. Apparatus for identifying spoken words comprising means responsive to the spoken words for producing electrical signals, direct view cathode ray storage means responsive to the electrical signals for providing at least one display waveform representing amplitude variations with time of at least one frequency component of the spoken word, known word library means including a number of standard amplitude variations with time for like frequency components of known words, the known word library means being successively movable past the direction view cathode ray storage means, and means associated with the direct view cathode ray means and the known word library means for determining the best match between the amplitude variations with time of the unknown spoken word and one of the known words.

4. Apparatus for identifying spoken words including in combination means for producing electrical signals corresponding to the spoken words, means responsive to the electrical signals for producing normalized individual electrical signals therefrom, each of the normalized electrical signals constituting amplitude variations with time of a different frequency component of the spoken words, means including a direct view cathode ray storage means responsive to the normalized signals for providing a luminous display along a reference line of at least one of the normalized electrical signals, a reference member having standard indicia thereon movable adjacent the reference line of the direct view storage means, the reference member having contrasting opaque and transparent areas, the transparent area being configured to represent the amplitude variations with time of the frequency components of normalized known words, corresponding to the normalized unknown words, photosensitive means disposed on the opposite side of the reference means from the direct view storage means for detecting variations in the transmission of light as the reference means is passed next to the cathode ray storage means, and output means responsive to the photosensitive means and coupled to the reference means for identifying the known word corresponding to the best match between the unknown spoken word and a selected one of the patterns of the reference means.

5. A machine for recognizing spoken words including in combination an audio recording device, a plurality of filter means responsive to reproduced signals from the audio recording device, the filter means including means responsive to the length, pitch and amplitude of the words represented by the recorded audio signals for normalizing said signals, a light generating storage display means responsive to the filter means for providing normalized curves representing amplitude variations with time of selected frequency components of an unknown spoken word, the storage display means having a display surface on a selected area of which the normalized words are represented, a principally opaque reference means movable past the reference area of the display means on which the normalized signals are represented, the reference means including transparent patterns corresponding to the amplitude variations with time of the corresponding selected frequency components of known words, a photosensitive means disposed on the opposite side of the reference means from the light generating storage means, the photosensitive means providing signals whose amplitude represents a measure of the match between the displayed signal patterns and the standard signal patterns, comparator means coupled to the reference means and responsive to the photosensitive means for comparing the maximum output of the photosensitive means for a given word with each successive scanning of a presented unknown word signal pattern by a different reference pattern to determine the best match corresponding to a given word, and character representing means responsive to the comparator means and operating serially to provide representations of the successive alpha numeric characters of the unknown spoken word which corresponds to a stored word as determined by the comparator means.

6. Apparatus for identifying unknown spoken words comprising means responsive to the unknown spoken words for providing a frequency segmented visual display of selected characteristics of each individual word, reference means including a plurality of stored reference patterns movable individually past the displayed character in succession for scanning the reference patterns across the patterns of the unknown word, optical sensing means for detecting the degree of match between the unknown word patterns and the reference patterns, and means responsive to the best match for serially providing successive digital characters representative of the characters of the unknown spoken word.

7. Apparatus for identifying different manifestations of intelligence comprising means responsive to unknown manifestations for providing a luminous display of at least one selected characteristic of each manifestation, reference means including a plurality of stored reference patterns movable individually past the luminous display in succession for optically scanning the reference patterns across the display of the characteristic of the unknown manifestation, optical sensing means for detecting the maximum match between the luminous display and the reference patterns, and means responsive to the maximum match for identifying the manifestation in accordance with the reference pattern.

8. A reference mask for facilitating the recognition of time varying waveforms representative of different characteristics of selected frequency components of a spoken word, the reference mask including at least one reference line defined by contrasting transparent and opaque surfaces on a reference element, each reference line having variations in two dimensions corresponding generally to the variations with time of a selected characteristic of the spoken word and including opacity variations transverse to the length of the line which encompass deviations in the characteristics of individual spoken words arising due to noise effects introduced by individual pitch, intensity and speech rate characteristics, the transverse variations being provided by partially opaque shadings which continuously vary in the transverse direction between the transparent areas and the opaque areas.

9. A reference mask for facilitating the recognition of time varying waveforms representative of different characteristics of selected frequency components of a spoken word, the reference mask including at least one reference line defined by contrasting transparent and opaque surfaces on a reference element, each reference line having variations in two dimensions corresponding generally to the variations with time of a selected characteristic of the spoken word and including opacity variations transverse to the length of the line which encompass deviations in the characteristics of individual spoken words arising due to noise effects introduced by individual pitch, intensity and speech rate characteristics, the transverse variations being provided by the superposition of at least two lines representing the selected time varying characteristics of different expressions of the same spoken word, each of the lines having partially opaque shadings which vary in the transverse direction.

10. A readout system for operation with a cyclically operating word recognition system having code comparing means coupled to means operating to provide the successive characters of an identified word, the readout system including the combination of coded reference means operating cyclically in synchronism with the cyclically operating word recognition system, the coded reference means including individual matrices having successive positions which represent in coded form the individual characters of a different spoken word, a plurality of individual means for sensing the different character positions of the matrices, and stepping switch means responsive to the cyclic operation of the word recognition system and coupled to the sensing means for operating the individual sensing means in series during successive cycles of the word recognition system to provide the individual characters of the identified word in serial fashion.

References Cited in the file of this patent

UNITED STATES PATENTS

| | | |
|---|---|---|
| 2,014,741 | Lesti | Sept. 17, 1935 |
| 2,137,888 | Fuller | Nov. 22, 1938 |
| 2,575,909 | Davis et al. | Nov. 20, 1951 |
| 2,575,910 | Mathes | Nov. 20, 1951 |
| 2,646,465 | Davis et al. | July 21, 1953 |
| 2,685,615 | Biddulph et al. | Aug. 3, 1954 |